US012340446B2

(12) United States Patent
Newsom

(10) Patent No.: US 12,340,446 B2
(45) Date of Patent: Jun. 24, 2025

(54) COMBINING PRESET AND AUTO SETTINGS IN IMAGE EDITING

(71) Applicant: DVLOP, LLC, San Luis Obispo, CA (US)

(72) Inventor: Jeffrey S. Newsom, San Luis Obispo, CA (US)

(73) Assignee: DVLOP, LLC, San Luis Obispo, CA (US)

(*) Notice: Subject to any disclaimer, the term of this patent is extended or adjusted under 35 U.S.C. 154(b) by 155 days.

(21) Appl. No.: 18/045,358

(22) Filed: Oct. 10, 2022

(65) Prior Publication Data

US 2023/0115490 A1     Apr. 13, 2023

Related U.S. Application Data

(60) Provisional application No. 63/253,786, filed on Oct. 8, 2021.

(51) Int. Cl.
*G09G 5/00* (2006.01)
*G06T 11/60* (2006.01)

(52) U.S. Cl.
CPC .................. *G06T 11/60* (2013.01)

(58) Field of Classification Search
CPC ....... G06F 9/4401; G06T 1/20; G06T 3/4007; G06T 9/00; G06T 11/001; G06T 11/60
USPC ........................................................ 345/581
See application file for complete search history.

(56) References Cited

U.S. PATENT DOCUMENTS

| 2019/0080205 A1* | 3/2019 | Kaufhold | G06F 18/214 |
| 2019/0251612 A1* | 8/2019 | Fang | G06Q 30/0643 |
| 2019/0295302 A1* | 9/2019 | Fu | G06V 10/82 |
| 2023/0359665 A1* | 11/2023 | Murata | G06F 16/54 |

* cited by examiner

*Primary Examiner* — Gordon G Liu
(74) *Attorney, Agent, or Firm* — Torrey Pines Law Group, PC

(57) ABSTRACT

An electronic device that performs image editing is described. During operation, the electronic device may provide, addressed to a computer system, an image. Then, the electronic device may receive, associated with the computer system, values of a set of parameters or settings, where the values of the set of parameters or settings correspond to auto-setting values of the set of parameters or settings and second values of the set of parameters or settings associated with a preset, where the preset is associated a user of the electronic device or another individual than the user. For example, the other individual may be a professional photographer. Next, the electronic device may perform, using image-editing software, the image editing on the image based at least in part on the values of the set of parameters or settings, where the image editing modifies one or more attributes of the image on a pixel basis.

20 Claims, 9 Drawing Sheets
(4 of 9 Drawing Sheet(s) Filed in Color)

COMBINING PRESET AND AUTO SETTINGS IN IMAGE EDITING

CROSS REFERENCE TO RELATED APPLICATIONS

This application claims priority under 35 U.S.C. 119(e) to U.S. Provisional Application Ser. No. 63/253,786, "Auto Setting Compensation," filed on Oct. 8, 2021, by Jeffrey S. Newsom, the contents of which are herein incorporated by reference.

FIELD

The described embodiments relate to processing of images. Notably, the described embodiments relate to combining preset (or settings associated with a style or user preferences) and auto settings in image editing.

BACKGROUND

Image-editing software is widely used to modify digital images after acquisition. Notably, image-editing software may be used to perform image editing on a digital image based on one or more parameters or settings. For example, image-editing software may be used to filter, on a pixel-basis, a digital image based on the one or more parameters or settings. This image editing may modify one or more attributes of the digital image, such as: the brightness, the exposure, color, white balance, etc.

In order to simplify the use of image-editing software, image-editing software typically include automatic settings (which are sometimes referred to as 'auto settings'), which use predefined values of the one or more parameters or settings during the image editing. Moreover, image-editing software allows a user to manually adjust or modify the values of the one or more parameters or settings. In addition, a style (which is sometimes referred to as a 'preset'), such as one associated with an individual, e.g., a professional photographer, may be used. Notably, a style may include a set of values for the one or more parameters or settings. This capability allows the user to mimic the style of the professional photographer.

However, the use of user-defined settings or presets is often incompatible with the use of auto settings. Notably, auto settings typically override prior values of the one or more parameters or settings. For example, when a user imports a preset and then selects auto settings, the set of values for the one or more parameters or settings are usually overwritten. This constrains the ability of users to customize or tailor the values for the one or more parameters or settings, which is frustrating for users of image-editing software.

SUMMARY

An electronic device that performs image editing is described. This electronic device includes: an interface circuit that communicates with a computer system; a computation device; and a memory that stores program instructions. During operation, the electronic device provides, addressed to the computer system, an image. Then, the electronic device receives, associated with the computer system, values of a set of parameters or settings, where the values of the set of parameters or settings correspond to auto-setting values of the set of parameters or settings and second values of the set of parameters or settings associated with a preset. Next, the electronic device performs, using image-editing software, the image editing on the image based at least in part on the values of the set of parameters or settings.

Moreover, the electronic device may include an image sensor, and the electronic device may acquire the image using the image sensor.

Furthermore, the preset may be associated with a user of the electronic device or another individual than the user. For example, the other individual may be a professional photographer.

Additionally, the values of the set of parameters or settings may include the combination of the auto-setting values and the second values associated with the preset. Alternatively, the values of the set of parameters or settings may include differences between the auto-setting values and the second values associated with the preset. For example, the values of the set of parameters or settings may be the differences from the average or median second values associated with the preset. In these embodiments, the electronic device may combine the differences with the second values of the set of parameters or settings associated with the preset to compute modified values of the set of parameters or settings, and the image editing is performed based at least in part on the modified values of the set of parameters or settings. Moreover, combining may include adding the differences to the second values of the set of parameters or settings associated with the preset.

Note that the image editing may be performed on a pixel-basis in the image.

In some embodiments, the values of the set of parameters or settings is associated with a pretrained machine-learning model that predicts the values of the set of parameters or settings for the image. Moreover, the pretrained machine-learning model may include a neural network.

Furthermore, the image editing may modify one or more attributes of the image.

Another embodiment provides the computer system. This computer system may include: an interface circuit that communicates with an electronic device; a computation device; and a memory that stores program instructions. During operation, the computer system receives, associated with the electronic device, an image. Then, the computer system predicts values of a set of parameters or settings for the image based at least in part on a pretrained machine-learning model, where the values of the set of parameters or settings correspond to auto-setting values of the set of parameters or settings and second values of the set of parameters or settings associated with a preset. Next, the computer system provides, addressed to the electronic device, the values of the set of parameters of settings.

Moreover, the preset may be associated with a user of the electronic device or another individual than the user. For example, the other individual may be a professional photographer.

Furthermore, the values of the set of parameters or settings may include the combination of the auto-setting values and the second values associated with the preset. Alternatively, the values of the set of parameters or settings may include differences between the auto-setting values and the second values of the set of parameters or settings associated with the preset. For example, the values of the set of parameters or settings may be the differences from the average or median second values associated with the preset.

Note that the values of the set of parameters or settings may be associated with image editing of the image. For example, the image editing may be performed on a pixel-basis in the image. Additionally, the image editing may modify one or more attributes of the image.

In some embodiments, the pretrained machine-learning model may include a neural network.

Another embodiment provides a second electronic device that jointly uses auto settings of the values for the set of parameters or setting and the second values of the set of parameters or settings associated with the preset.

Another embodiment provides a computer for use, e.g., in the computer system.

Another embodiment provides a computer-readable storage medium for use with the electronic device, the second electronic device, the computer or the computer system. When executed by the electronic device, the second electronic device, the computer or the computer system, this computer-readable storage medium causes the electronic device, the second electronic device, the computer or the computer system to perform at least some of the aforementioned operations.

Another embodiment provides a method, which may be performed by the electronic device, the second electronic device, the computer or the computer system. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

The patent or application file contains at least one drawing executed in color. Copies of this patent or patent application publication with color drawing(s) will be provided by the Office upon request and payment of the necessary fee.

Note that like reference numerals refer to corresponding parts throughout the drawings. Moreover, multiple instances of the same part are designated by a common prefix separated from an instance number by a dash.

DETAILED DESCRIPTION

Figure 1:
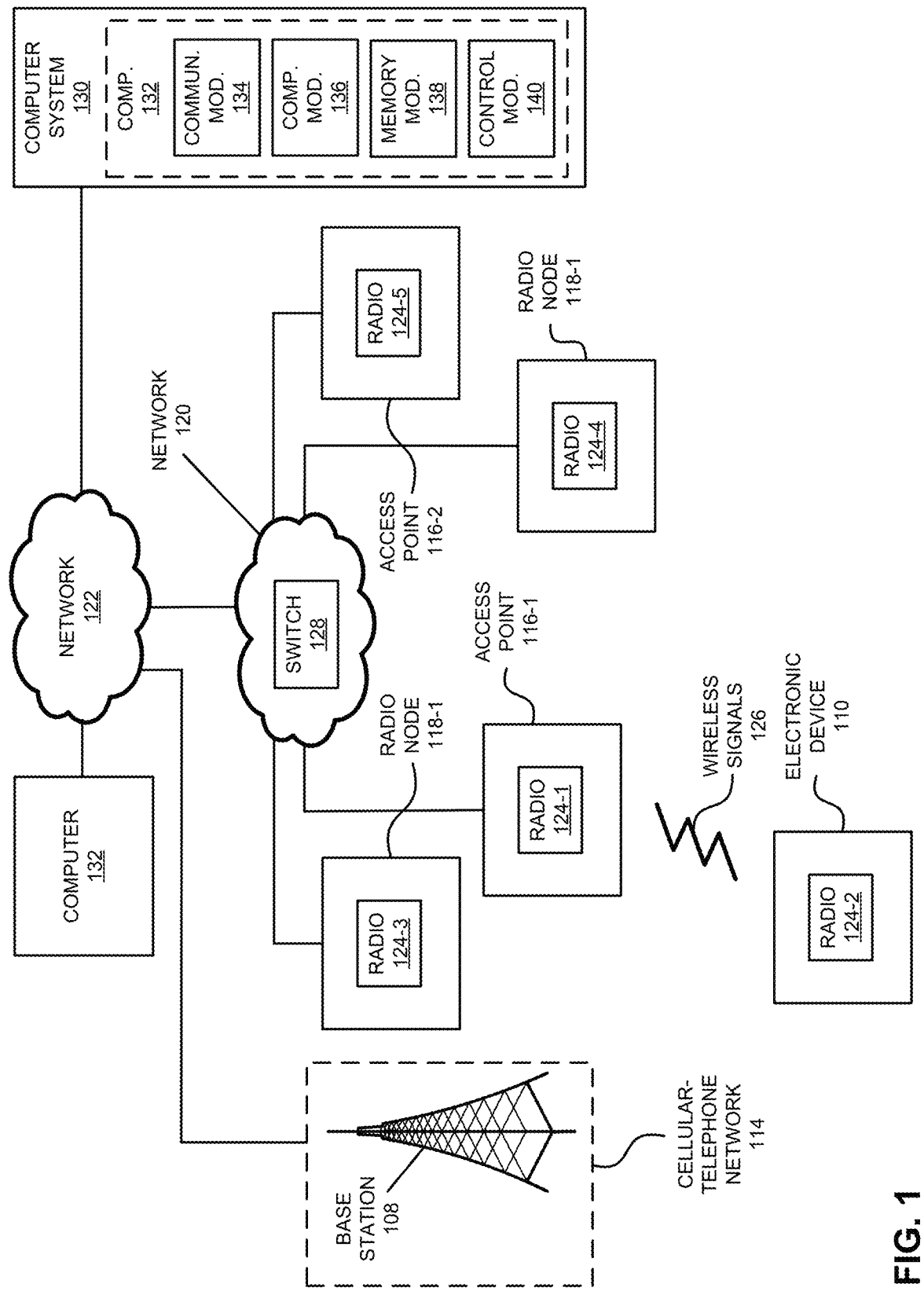
FIG. 1 is a block diagram illustrating an example of communication between an electronic device and a computer system in accordance with an embodiment of the present disclosure.

An electronic device that performs image editing is described. During operation, the electronic device may provide, addressed to a computer system, an image. Then, the electronic device may receive, associated with the computer system, values of a set of parameters or settings, where the values of the set of parameters or settings correspond to auto-setting values of the set of parameters or settings and second values of the set of parameters or settings associated with a preset, where the preset is associated with a user of the electronic device or another individual than the user. For example, the other individual may be a professional photographer. Next, the electronic device may perform, using image-editing software, the image editing on the image based at least in part on the values of the set of parameters or settings, where the image editing modifies one or more attributes of the image on a pixel basis.

By performing the image editing, these image-editing techniques allow joint use of auto settings of the values for the set of parameters or settings and the second values of the set of parameters or settings associated with the preset. Notably, the values of the set of parameters or settings may ensure that the auto setting of the values for the set of parameters or settings do not override the second values of the set of parameters or setting associated with the preset. These capabilities may allow users to customize or tailor the values for the set of parameters or settings, which may increase the user satisfaction of users of the image-editing software.

In the discussion that follows, electronic devices, computers and/or computer systems that include one or more computers (which may be local or remotely located from each other) may communicate packets or frames in accordance with a wired communication protocol and/or a wireless communication protocol. The wireless communication protocol may include: a wireless communication protocol that is compatible with an Institute of Electrical and Electronics Engineers (IEEE) 802.11 standard (which is sometimes referred to as 'Wi-Fi®' from the Wi-Fi Alliance of Austin, Texas), Bluetooth, Bluetooth low energy, a cellular-telephone network or data network communication protocol (such as a third generation or 3G communication protocol, a fourth generation or 4G communication protocol, e.g., Long Term Evolution or LTE (from the $3^{rd}$ Generation Partnership Project of Sophia Antipolis, Valbonne, France), LTE Advanced or LTE-A, a fifth generation or 5G communication protocol, a low-power wide area network (LPWAN) cellular technology (such as CAT-M1, narrow band Internet of things, etc.), or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, the wired communication protocol may include a wired communication protocol that is compatible with an IEEE 802.3 standard (which is sometimes referred to as 'Ethernet'), e.g., an Ethernet II standard. However, a wide variety of communication protocols may be used. In the discussion that follows, Bluetooth and Ethernet are used as illustrative examples.

We now describe some embodiments of the image-editing techniques. FIG. 1 presents a block diagram illustrating an example of communication between a an electronic device 110 (such as a cellular telephone, a portable electronic device, or another type of electronic device, etc.) and a computer system 130 (which may include one or more computers or servers, and which may be implemented locally or remotely to provide an image analysis service) via a cellular-telephone network 114 (which may include a base station 108), one or more access points 116 (which may communicate using Wi-Fi) in a wireless local area network (WLAN) and/or radio node 118 (which may communicate using LTE or a cellular-telephone data communication protocol) in a small-scale network (such as a small cell). For example, radio node 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio node 118 may be included in one or more networks, such as: a WLAN, a small cell, a local area network (LAN) and/or a cellular-telephone network. In some embodiments, access points 116 may include a physical access point and/or a virtual access point that is implemented in software in an environment of an electronic device or a computer.

Furthermore, one or more base stations (such as base station 108), access points 116, and/or radio node 118 may communicate computer system using a wired communication protocol (such as Ethernet) via network 120 and/or 122. Note that networks 120 and 122 may be the same or different networks. For example, networks 120 and/or 122 may be a LAN, an intra-net or the Internet. Additionally, in some embodiments, network 120 may include one or more routers and/or switches (such as switch 128).

Electronic device 110 and/or computer system 130 may implement at least some of the operations in the image-editing techniques. Notably, as described further below, electronic device 110 and/or computer system 130 may perform at least some of the image analysis and/or image editing of one or more images (such as one or more images acquired by electronic device 110).

Figure 7:
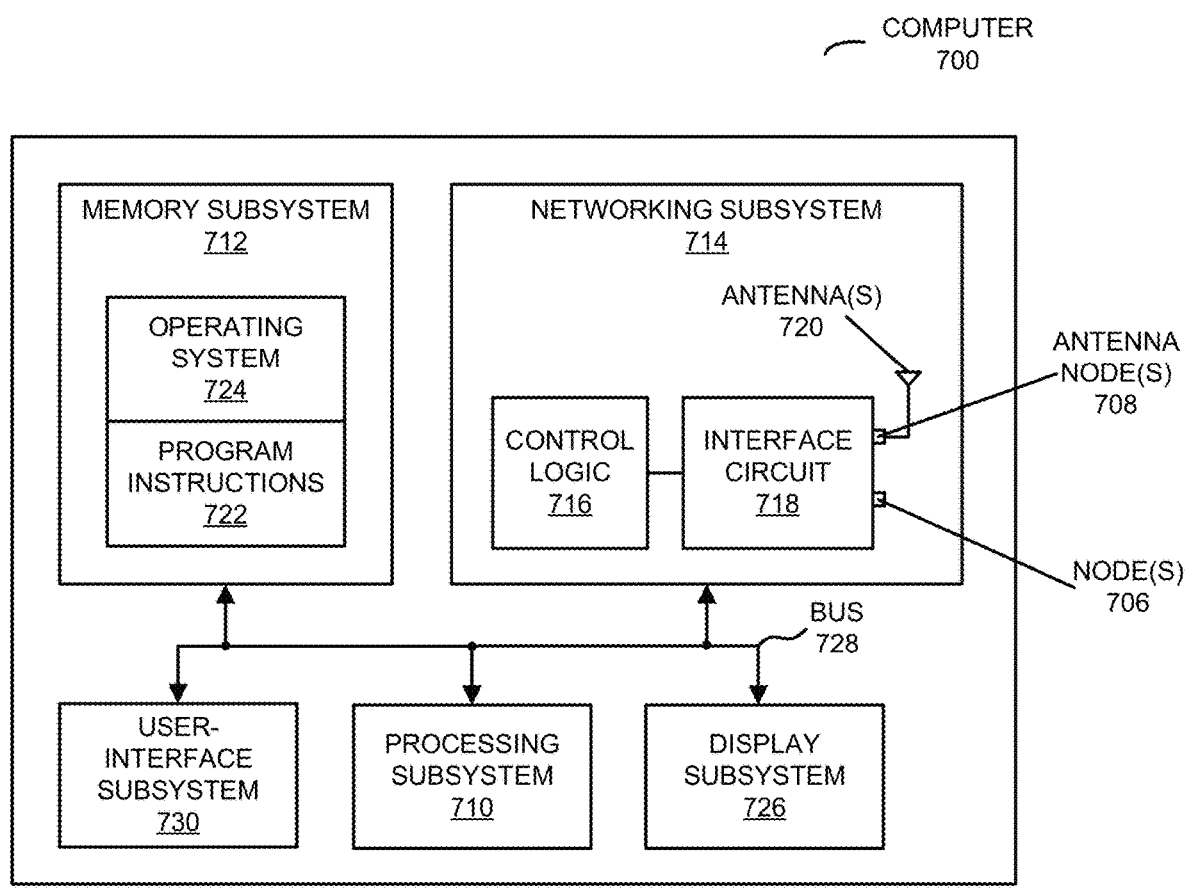
FIG. 7 is a block diagram illustrating an example of an electronic device in accordance with an embodiment of the present disclosure.

As described further below with reference to FIG. 7, base station 108, electronic device 110, access points 116, radio node 118, switch 128 and/or computer system 130 may include subsystems, such as a networking subsystem, a memory subsystem and a processor subsystem. In addition, electronic device 110, access points 116 and radio node 118 may include radios 124 in the networking subsystems. More generally, electronic device 110, access points 116 and radio node 118 can include (or can be included within) any electronic devices with the networking subsystems that enable electronic device 110, access points 116 and radio node 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, base station 108, electronic device 110, access points 116, radio node 118 and/or computer system 130 may wired or wirelessly communicate while: transmitting access requests and receiving access responses on wired or wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio node 118 and electronic device 110. For example, radio 124-1 in access point 116-1 may transmit information (such as one or more packets or frames) using wireless signals 126. These wireless signals are received by radio 124-2 in electronic device 110. This may allow access point 116-1 to communicate information to other access points 116 and/or electronic device 110. Note that wireless signals 126 may convey one or more packets or frames.

In the described embodiments, processing a packet or a frame in one or more electronic devices in electronic device 110, access points 116, radio node 118 and/or computer system 130 may include: receiving the wireless or electrical signals with the packet or the frame; decoding/extracting the packet or the frame from the received wireless or electrical signals to acquire the packet or the frame; and processing the packet or the frame to determine information contained in the payload of the packet or the frame.

Note that the wired and/or wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 7 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA) and/or multiple-input multiple-output (MIMO).

Although we describe the network environment shown in FIG. 1 as an example, in alternative embodiments, different numbers or types of electronic devices and/or monitoring devices may be present. For example, some embodiments comprise more or fewer electronic devices or monitoring devices. In some embodiments, a monitoring device may be integrated into or included in another electronic device. As another example, in another embodiment, different electronic devices are transmitting and/or receiving packets or frames.

While FIG. 1 illustrates computer system 130 at a particular location, in other embodiments at least a portion of computer system 130 is implemented at more than one location. Thus, in some embodiments, computer system 130 is implemented in a centralized manner, while in other embodiments at least a portion of computer system 130 is implemented in a distributed manner.

Moreover, computer system 130 may include one or more computers 132. These computers may include: communication modules 134, computation modules 136, memory modules 138, and optional control modules 140. Note that a given module or engine may be implemented in hardware and/or in software. Furthermore, computation modules 136 may perform calculations using: one or more microprocessors, ASICs, microcontrollers, programmable-logic devices, graphics processing units (GPUs) and/or one or more digital signal processors (DSPs). Note that a given computation component is sometimes referred to as a 'computation device'. Additionally, memory modules 138 may access stored data or information in memory local in computer system 130 and/or that is remotely located from computer system 130. Notably, in some embodiments, one or more of memory modules 138 may access stored information in the local memory. In other embodiments, one or more memory modules 138 may access, via one or more of communication modules 134, stored information in the remote memory Although we describe the computation environment shown in FIG. 1 as an example, in alternative embodiments, different numbers or types of components may be present in computer system 130. For example, some embodiments may include more or fewer components, a different component, and/or components may be combined into a single component, and/or a single component may be divided into two or more components.

As discussed previously, it can be difficult to customize settings or parameters in image-editing software (such as image-editing software from Adobe Systems of San Jose, California, e.g., Adobe Lightroom). Notably, it can be difficult to use a preset and auto settings.

Moreover, as described further below with reference to FIGS. 2-6D, in order to address these challenges electronic device 110 and/or computer system 130 may perform the image-editing techniques. Notably, during the image-editing techniques, a user of electronic device 110 may optionally acquire one or more images using an image sensor (such as a CCD or a CMOS image sensor) in electronic device 110. Then, electronic device may provide at least one of the one or more images to computer system 130.

One or more of communication modules 134 in computer system 130 may receive the image via network 120 and 122. Then, one or more of optional control modules 140 may divide the image analysis among one or more computers 132. For example, a given one of computers 132 may perform at least a designated portion of the image analysis. Notably, one or more computation modules 136 (such as a processor or a GPU) may implement at least one of one or more predetermined or pretrained machine-learning models, e.g., based at least in part on configuration instructions and hyperparameters. Then, using at least the one of the one or more predetermined or pretrained machine-learning models, one or more computation modules 136 may predict values of a set of parameters or settings for the image, where the values of the set of parameters or settings correspond to auto-setting values of the set of parameters or settings and second values of the set of parameters or settings associated with a preset.

In some embodiments, at least the one of the one or more predetermined or pretrained machine-learning models may include a neural network, which may include or combine one or more convolutional layers, one or more residual layers and one or more dense or fully connected layers, and where a given node in a given layer in the given neural network may include an activation function, such as: a rectified linear activation function or ReLU, a leaky ReLU, an exponential linear unit or ELU activation function, a parametric ReLU, a tanh activation function, and/or a sigmoid activation function.

After one or more of the computation modules 136 computes the values of the set of parameters or settings, the one or more of optional control modules 140 may instruct one or more of communication modules 134 to return, via network 120 and 122, the values of the set of parameters or settings to electronic device 110. In some embodiments, the one or more of optional control modules 134 may instruct one or more memory modules 138 to include the values of the set of parameters or settings in a training dataset, which may be used by one or more computation modules 136 to retrain at least the one of one or more predetermined or pretrained machine-learning models (such as revising the configuration instructions and the hyperparameters).

Moreover, after receiving the values of the set of parameters or settings, electronic device 110 may execute image-editing software, and may perform, using the image-editing software, image editing at least the image based at least in part on the values of the set of parameters or settings. This image editing may modify one or more attributes of at least the image.

In these ways, electronic device 110 and computer system 130 may allow the joint use of auto settings of the values for the set of parameters or settings and the second values of the set of parameters or settings associated with the preset. These capabilities may allow users to customize or tailor the values for the set of parameters or settings, which may increase the user satisfaction of users of the image-editing software.

While the previous embodiments illustrate computer system 130 performing at least a portion of the image-editing techniques (such as the image analysis), in some embodiments some or all of the operations performed by computer system 130 may be performed by the image-editing software or a plug-in module associated with the image-editing software. Consequently, operations in the image-editing techniques may be performed locally on electronic device 110 and/or remotely (e.g., by computer system 130). For example, in some embodiments, the image-editing techniques may be implemented solely by the image-editing software executed by electronic device 110.

Figure 2:
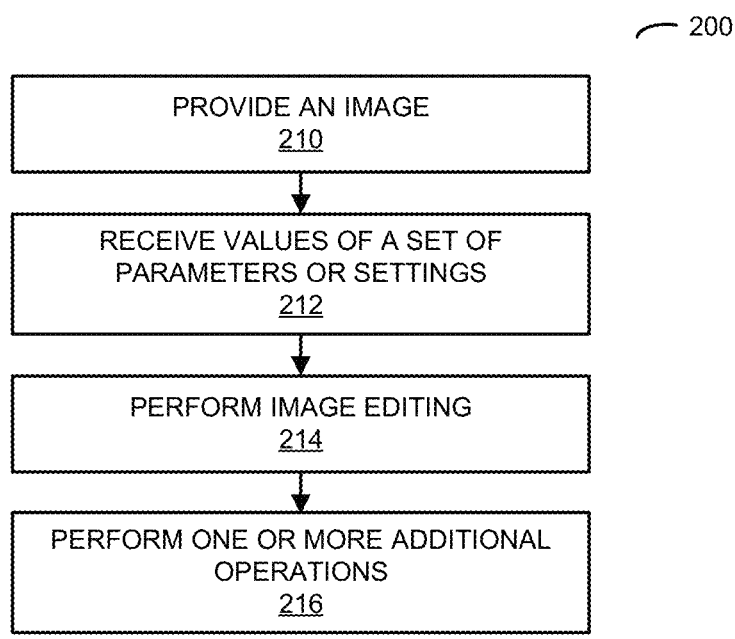
FIG. 2 is a flow diagram illustrating an example of a method for performing image editing using an electronic device in FIG. 1 in accordance with an embodiment of the present disclosure.

We now describe embodiments of the method. FIG. 2 presents a flow diagram illustrating an example of a method 200 for performing image editing, which may be performed by an electronic device (such as electronic device 110 in FIG. 1). During operation, the electronic device may provide, addressed to a computer system, an image (operation 210).

Then, the electronic device may receive, associated with the computer system, values of a set of parameters or settings (operation 212), where the values of the set of parameters or settings correspond to auto-setting values of the set of parameters or settings and second values of the set of parameters or settings associated with a preset. Note that the preset may be associated with a user of the electronic device or another individual or a third party (who is other than the user or who is different from a provider of image-editing software), such as a professional photographer.

Next, the electronic device may perform, using the image-editing software, the image editing (operation 214) on the image based at least in part on the values of the set of parameters or settings. Note that the image editing may be performed on a pixel-basis in the image. Moreover, the image editing may modify one or more attributes of the image.

In some embodiments, the electronic device may optionally perform one or more additional operations (operation 216). For example, the electronic device may include an image sensor, and the electronic device may acquire the image using the image sensor.

Moreover, the values of the set of parameters or settings may include the combination of the auto-setting values and the second values of the set of parameters or settings associated with the preset. Alternatively, the values of the set of parameters or settings may include differences between the auto-setting values and the second values of the set of parameters or settings associated with the preset. For example, the values of the set of parameters or settings may be the differences from the average or median second values associated with the preset. In these embodiments, the electronic device may combine the differences with the second values of the set of parameters or settings associated with the preset to compute modified values of the set of parameters or settings, and the image editing is performed based at least in part on the modified values of the set of parameters or settings. Note that the combining may include adding the differences to the second values of the set of parameters or settings associated with the preset.

Furthermore, the values of the set of parameters or settings is associated with a pretrained machine-learning model that predicts the values of the set of parameters or settings for the image. Additionally, the pretrained machine-learning model may include a neural network.

Figure 3:
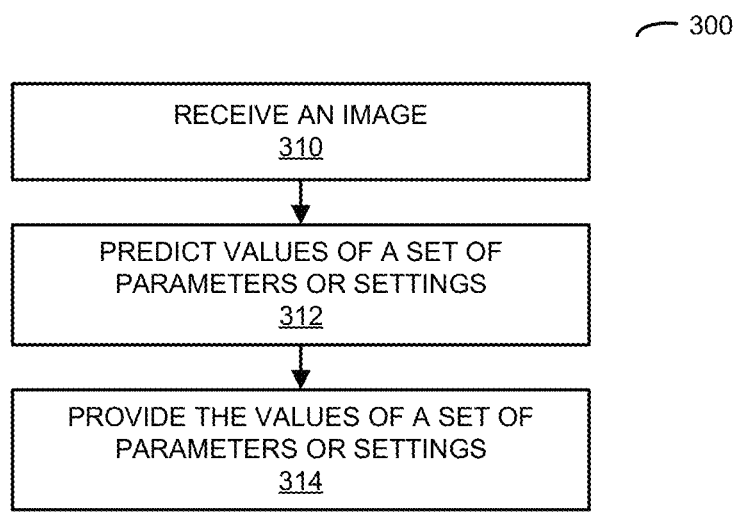
FIG. 3 is a flow diagram illustrating an example of a method for computing values of a set of parameters or settings using computer system in FIG. 1 in accordance with an embodiment of the present disclosure.

FIG. 3 presents a flow diagram illustrating an example of a method 300 for computing values of a set of parameters or settings, which may be performed by a computer system (such as computer system 130 in FIG. 1). During operation, the computer system may receive, associated with an electronic device, an image (operation 310).

Then, the computer system may predict the values of a set of parameters or settings (operation 312) for the image based at least in part on a pretrained machine-learning model, where the values of the set of parameters or settings correspond to auto-setting values of the set of parameters or settings and second values of the set of parameters or settings associated with a preset. Note that the preset may be associated with a user of the electronic device or another individual or a third party (who is other than the user or who is different from a provider of image-editing software), such as a professional photographer. In some embodiments, the pretrained machine-learning model may include a neural network.

Moreover, the values of the set of parameters or settings may include the combination of the auto-setting values and the second values of the set of parameters or settings associated with the preset. Alternatively, the values of the set of parameters or settings may include differences between the auto-setting values and the second values of the set of parameters or settings associated with the preset. For example, the values of the set of parameters or settings may be the differences from the average or median second values associated with the preset.

Next, the computer system may provide, addressed to the electronic device, the values of the set of parameters of settings (operation 314).

Note that the values of the set of parameters or settings may be associated with or used for image editing of the image. For example, the image editing may be performed on a pixel-basis in the image. Additionally, the image editing may modify one or more attributes of the image.

In some embodiments of method 200 (FIG. 2) and/or 300, there may be additional or fewer operations. Moreover, the order of the operations may be changed, and/or two or more operations may be combined into a single operation.

Figure 4:
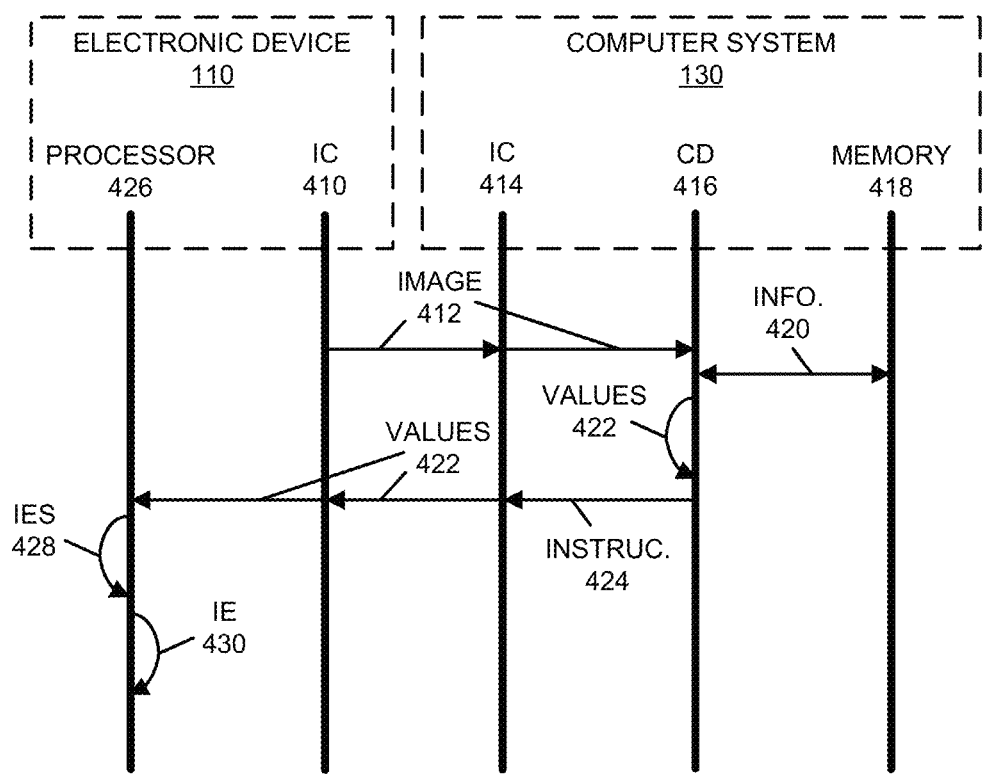
FIG. 4 is a drawing illustrating an example of communication between an electronic device and a computer system in FIG. 1 in accordance with an embodiment of the present disclosure.

Embodiments of the image-editing techniques are further illustrated in FIG. 4, which presents a drawing illustrating an example of communication between electronic device 110 and computer system 130. In FIG. 4, an interface circuit (IC) 410 in electronic device 110 may provide an image 412 to computer system 130.

After receiving image 412, an interface circuit 414 in computer system 130 provides image 412 to a computation device (CD) 416 (such as a processor or a GPU) in computer system 130. Computation device 416 in computer system 130 may access, in memory 418 in computer system 130, information 420 specifying configuration instructions and hyperparameters for one or more predetermined or pretrained machine-learning models, such as one or more neural networks. After receiving the configuration instructions and the hyperparameters, computation device 416 may implement at least one of the one or more predetermined or pretrained machine-learning models.

Then, using at least the one of the one or more predetermined or pretrained machine-learning models, computation device 416 may predict values 422 of a set of parameters or settings for image 412, where values 422 of the set of parameters or settings correspond to auto-setting values of the set of parameters or settings and second values of the set of parameters or settings associated with a preset. Next, computation device 416 may instruct 424 interface circuit 414 to provide values 422 of the set of parameters or settings to electronic device 110.

After receiving values 422 of the set of parameters or settings, interface circuit 410 may provide values 422 of the set of parameters or settings to processor 426 in electronic device 110. Then, processor 426 may execute image-editing software (IES) 428, and processor 426 may perform, using image-editing software 428, image editing (IE) 430 on image 412 based at least in part on values 422 of the set of parameters or settings.

While FIG. 4 illustrates communication between components using unidirectional or bidirectional communication with lines having single arrows or double arrows, in general the communication in a given operation in this figure may involve unidirectional or bidirectional communication.

We now further describe embodiments of the image-editing techniques. Using internal or external auto settings in image editing software to edit an image typically overrides predesigned looks from presets or styles (which are designed by one or more photographers). Moreover, internal or external software-based auto-editing settings are also often wildly inconsistent and are not typically user-modifiable.

The disclosed image-editing techniques address these problems, thereby improving built-in photo image-processing or editing software auto settings or auto settings from a software plug-in, external software program and/or a cloud-based computer system while retaining the desired look from the applied preset or style.

Notably, by charting the settings applied by running auto settings to thousands of images, the image-editing techniques document and discover situational tendencies and averages. Leveraging this knowledge and using custom camera profiles (which may be used to correct for differences between different camera models), look-up tables (luts) and/or settings within creative profiles (or presets) in the image-editing software, the image-editing techniques can determine values of a set of parameters or settings that combine auto-setting values of the set of parameters or settings with values of the set of parameters or settings associated with a preset. This may allow the image-editing software to compensate for the inconsistencies and to significantly improve accuracy. Moreover, the image-editing techniques may use the camera profiles, look-up tables and/or creative profiles to prevent the values of the set of parameters or settings associated with the preset from being overwritten when auto settings are used. Consequently, the image-editing techniques may determine values of the set of parameters or settings that provide fully automatic presets for various image-editing software platforms that retain the original vision intended within the preset design while improving on the built-in or external auto-setting values of the set of parameters or settings. These capabilities not only improve on the auto settings, but also allow camera-system specific or camera-platform specific improvements.

By analyzing thousands of situational images or photos (such as raw files and/or compressed files, e.g., files that are compatible with a Joint Photographic Experts Group or JPEG format or another format), the image-editing techniques can compute the average or median (and, more generally, a moment of the distribution) auto-adjustment tendencies. For example, average or median auto adjustment values of the set of parameters or settings for a particular indoor images with natural light may include: exposure: +0.92, contrast: +6, highlights: −58, shadows: +50, whites: +6, blacks: −13, vibrance: +15, and saturation: +1.

However, as noted previously, typically in image-editing software values of the set of parameters or settings associated with a preset are overwritten when auto settings are enabled. Notably, values of the set of parameters or settings for a given preset may include: contrast: +20, highlights: −44, shadows: +47, whites: −26, blacks: −30, vibrance: 0, and saturation: 0. Note that presets usually do not modify exposure.

In order to retain the qualities of the preset design while enabling auto settings, in some embodiments of the image-editing techniques values of the set of parameters or settings may be compensated by adding or subtracting compensation values of the set of parameters or settings in a non-user modifiable channel (such as creative profiles and/or one or more look-up table) to reduce or eliminate the difference between the auto settings and the preset. For example, the auto-setting value for contrast may be +6 and the value for contrast in the preset may be +20, so the compensation value for contrast in the creative profile or the look-up table may be +14. Moreover, the auto-setting value for highlights may be −58 and the value for highlights in the preset may be −44, so the compensation value for highlights in the creative profile or the look-up table may be +14. Furthermore, the auto-setting value for shadows may be +50 and the value for shadows in the preset may be +47, so the compensation value for shadows in the creative profile or the look-up table may be −3. Additionally, the auto-setting value for whites may be +6 and the value for whites in the preset may be −26, so the compensation value for whites in the creative profile or the look-up table may be −32. Similarly, the auto-setting value for blacks may be −13 and the value for blacks in the preset may be −30, so the compensation value for blacks in the creative profile or the look-up table may be −17. In some embodiments, the auto-setting value for vibrance may be +15 and the value for vibrance in the preset may be 0, so the compensation value for vibrance in the creative profile or the look-up table may be −15. Note that the auto-setting value for saturation may be +1 and the value for saturation in the preset may be 0, so the compensation value for saturation in the creative profile or the look-up table may be −1.

In some embodiments, the image-editing techniques may use relative adjustments to compensate for situational inaccuracies in exposure and/or white balance. For example, when the auto settings in combination with a preset tends to overexpose an image half a stop, the value of exposure in the set of parameters or settings may be reduced by −0.50 (i.e., the compensation value), thereby compensating for the overexposure. Alternatively or additionally, when the auto setting or in-camera white balance tends to be 250° too warm, the value of the white balance may be reduced by −250 (i.e., the compensation value).

Note that the values of the set of parameters or settings (or the compensation values) may be encrypted, e.g., by using one or more look-up tables that perform a mapping from the values of the set of parameters or settings to the encrypted values (or vice versa). This may allow the values of the set of parameters or settings to be obfuscated from the user of the image-editing software.

While the preceding discussion illustrated implementation of a portion of the image-editing techniques using a creative profile in a 'profile mode' in the image-editing software that is not overwrote by subsequently applied auto-setting values (such as by applying the values of the set of parameters or settings or compensation values in the creative profile and then applying the auto-setting values), in some embodiments the image-editing techniques are implemented using a plug-in module (or set of program instructions) and a cloud-based computer system. Notably, the cloud-based computer system may use a pretrained machine-learning model to analyze an image to determine the values of the set of parameters or settings.

For example, the plug-in module may upload an image to the cloud-based computer system. The cloud-based computer system may apply a pretrained machine-learning model to the image to predict values of the set of parameters or settings. Notably, the pretrained machine-learning model may have been trained on 200,000 images, and may predict the values or compensation values for the image to correction the auto-setting values for a particular preset (such as the average or median difference between the auto-setting values and the second values of the set of parameters of settings). Then, the cloud-based computer system may provide the computed values of the set of parameters or settings to the plug-in module. Next, the image-editing software may apply the values of the set of parameters or settings to the image to modify one or more attributes or characteristics of the images.

Thus, the image-editing techniques may be used to address the competition between the auto-setting values of the set of parameters or settings and the second values of the set of parameters or settings associated with a preset. Notably, the image-editing techniques may allow the concurrent use of auto-setting values and the second values of the set of parameters or settings associated with a preset, such as by correcting the auto-setting values for the average or median difference between the auto-setting values and the second values of the set of parameters or settings associated with the preset.

In some embodiments, the pretrained machine-learning model may be trained on a set of images (such as, e.g., the 200,000 images) in order to optimize the predicted values of the set of parameters or settings. For example, pretrained machine-learning model may initially be based at least in part on a ResNet or Residual Network (from Microsoft, Inc. of Redmond, Washington), which is updated during the training using transfer learning. Moreover, a single pretrained machine-learning model may the values of the set of parameters or settings, instead of a separate pretrained machine-learning model for a given parameter or setting. Furthermore, a custom loss function may be used to ensure that the pretrained machine-learning model is properly trained. For example, the loss function may include a weighted average of the values of the set of parameters or settings measuring the mean square error across the values of the set of parameters or settings. Note that, in some embodiments, the cloud-based computer system may receive the image and may provide the values of the set of parameters or settings via an application programming interface (API).

Moreover, in some embodiments, the same preset may be used for all training images. For example, the values of the set of parameters or settings may include auto settings, such as: an exposure of −0.70, a contrast of 0, highlights of −36, shadows of +29, whites of −45 and blacks of +5.

Then, individual adjustments may be made to one or more of the parameters or settings in order to optimize each edit. For example, the values of the set of parameters or settings may include: an exposure of −0.70, a contrast of −3, highlights of −11, shadows of +7, whites of −13 and blacks of −2.

Next, the median or average edit may be subtracted from the values of the set or parameters or settings for the combined training images and the remainder or compensation values may be returned. For example, the remainder or compensation values may be returned, such as: an exposure of −0.70, a contrast of −3, highlights of −47, shadows of +36, whites of −58 and blacks of +3.

Figure 5A:
FIGS. 5A-5D are images illustrating an example of image editing of an image in accordance with an embodiment of the present disclosure.
Figure 5B:
Figure 5C:
Figure 5D:

FIGS. 5A-5D and 6A-6D illustrate the image-editing techniques. Notably, FIG. 5A presents an example of an image for an unedited raw file. This image has been underexposed and may require a small exposure adjustment. Moreover, FIG. 5B presents an example of the image after a designer preset has been applied. Note that the image takes on the characteristics intended in the preset, but may still require user input to correct exposure and white balance. Furthermore, FIG. 5C presents an example of the image when auto settings are applied. However, this may override many of the characteristics the preset. In general, building auto settings into a preset typically makes it impossible to retain the user design, because most of the input present in the preset is overwritten by the image-editing software. Additionally, FIG. 5D presents the impact of the image-editing techniques on the image, which allows the use of a preset in conjunction with auto settings. Notably, because the second values of the set or parameters associated with a preset may be overwritten by auto-setting values. Consequently, in the image-editing techniques, compensation values are applied to compensate for overly or under aggressive auto-setting values to obtain the intended user design. This may correct for situational inconsistencies associated with the auto settings. The result may require little to no user input (i.e., it may be automatic) while retaining the stylistic choices in the preset design.

Figure 6A:
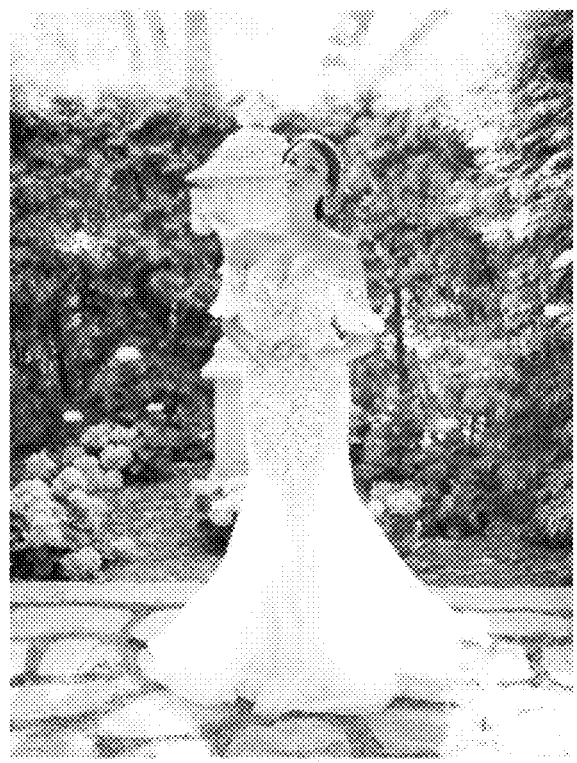
FIGS. 6A-6D are images illustrating an example of image editing of an image in accordance with an embodiment of the present disclosure.
Figure 6B:
Figure 6C:
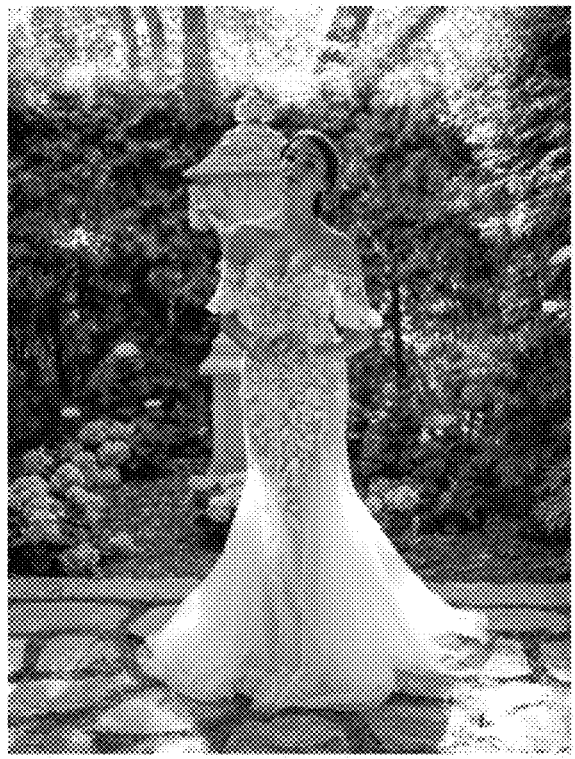
Figure 6D:
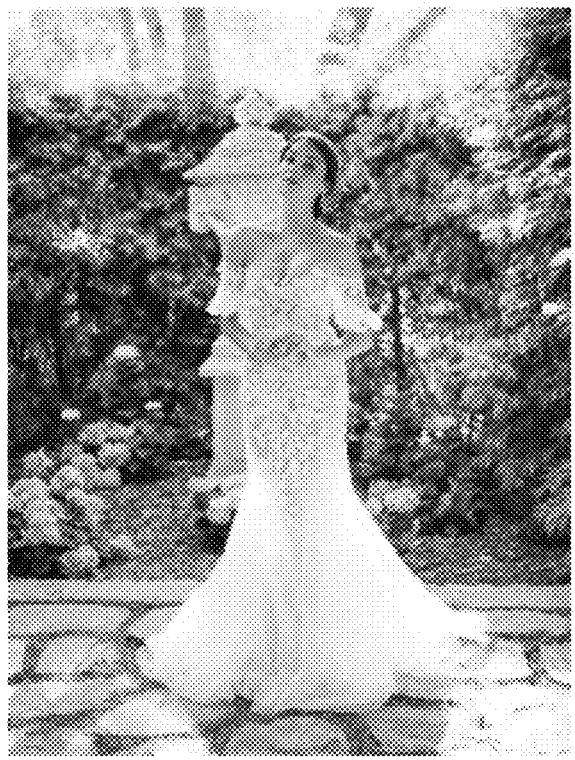

FIG. 6A presents an example of an image for an unedited raw file. This image has been overexposed and may require a small exposure adjustment. Moreover, FIG. 6B presents an example of the image after a designer preset has been applied. Note that the image takes on the characteristics intended in the preset, but may still require user input to correct exposure and white balance. Furthermore, FIG. 6C presents an example of the image when auto settings are applied. Once again, this may override many of the characteristics the preset. In general, building auto settings into a preset typically makes it impossible to retain the user design, because most of the input present in the preset is overwritten by the image-editing software. Additionally, FIG. 6D presents the impact of the image-editing techniques on the image, which allows the use of a preset in conjunction with auto settings.

While the preceding discussion illustrated the predetermined or pretrained machine-learning model with a neural network, in other embodiments a wide variety of pretrained machine-learning models may be used, such as a pretrained machine-learning model that was trained using a training dataset and a supervised learning technique and/or an unsupervised learning technique. For example, the pretrained machine-learning model may include a classifier or a regression model that was trained using: random forests, a support vector machine technique, a classification and regression tree technique, logistic regression, LASSO, linear regression, a neural network technique (such as deep learning, a convolutional neural network technique, an autoencoder neural network or another type of neural network technique), and/or another linear or nonlinear supervised-learning technique.

We now describe embodiments of an electronic device, which may perform at least some of the operations in the image-editing techniques. FIG. 7 presents a block diagram illustrating an example of an electronic device 700, e.g., electronic device 110 or a computer in computer system 130 in FIG. 1, in accordance with some embodiments. For example, electronic device 700 may include: one of computers 110. This computer may include processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, GPUs and/or one or more DSPs. Note that a given component in processing subsystem 710 are sometimes referred to as a 'computation device'.

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: program instructions or sets of instructions (such as program instructions 722 or operating system 724), which may be executed by processing subsystem 710. Note that the one or more computer programs or program instructions may constitute a computer-program mechanism. Moreover, instructions in the various program instructions in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that includes one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as antenna nodes 708, e.g., a metal pad or a connector, which can be coupled to the one or more antennas 720, or nodes 706, which can be coupled to a wired or optical connection or link. Thus, electronic device 700 may or may not include the one or more antennas 720. Note that the one or more nodes 706 and/or antenna nodes 708 may constitute input(s) to and/or output(s) from electronic device 700.) For example, networking subsystem 714 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between electronic devices, e.g., transmitting advertising or beacon frames and/or scanning for advertising frames transmitted by other electronic devices.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc. Moreover, electronic device 700 may include a user-interface subsystem 730, such as: a mouse, a keyboard, a trackpad, a stylus, a voice-recognition interface, and/or another human-machine interface.

Electronic device 700 can be (or can be included in) any electronic device with at least one network interface. For example, electronic device 700 can be (or can be included in): a desktop computer, a laptop computer, a subnotebook/netbook, a server, a supercomputer, a tablet computer, a smartphone, a smartwatch, a cellular telephone, a consumer-electronic device, a portable computing device, communication equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program instructions 722 are included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 714 and/or electronic device 700. The integrated circuit may include hardware and/or software mechanisms that are used for transmitting signals from electronic device 700 and receiving signals at electronic device 700 from other electronic devices. Aside from the mechanisms herein described, radios are generally known in the art and hence are not described in detail. In general, networking subsystem 714 and/or the integrated circuit may include one or more radios.

In some embodiments, an output of a process for designing the integrated circuit, or a portion of the integrated circuit, which includes one or more of the circuits described herein may be a computer-readable medium such as, for example, a magnetic tape or an optical or magnetic disk or solid state disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the image-editing techniques may be implemented using program instructions 722, operating system 724 (such as a driver for interface circuit 718) or in firmware in interface circuit 718. Thus, the image-editing techniques may be implemented at runtime of program instructions 722. Alternatively or additionally, at least some of the operations in the image-editing techniques may be implemented in a physical layer, such as hardware in interface circuit 718.

In the preceding description, we refer to 'some embodiments'. Note that 'some embodiments' describes a subset of all of the possible embodiments, but does not always specify the same subset of embodiments. Moreover, note that the numerical values provided are intended as illustrations of the image-editing techniques. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with a computer system;
a computation device coupled to the interface circuit; and
memory, coupled to the computation device, configured to store program instructions, wherein, when executed by the computation device, the program instructions cause the electronic device to perform operations comprising:
providing, addressed to the computer system, an image;
receiving, associated with the computer system, values of a set of parameters or settings, wherein the values of the set of parameters or settings correspond to auto-setting values of the set of parameters or settings and second values of the set of parameters or settings associated with a preset, wherein the values of the set of parameters or settings are based at least in part on or correspond to the image, and wherein the preset is associated with a third party that is different from a user of image-editing software or a provider of the image-editing software; and
performing, using the image-editing software, image editing on the image based at least in part on the values of the set of parameters or settings.

2. The electronic device of claim 1, wherein the electronic device comprises an image sensor, and the operations comprise acquiring the image using the image sensor.

3. The electronic device of claim 1, wherein the values of the set of parameters or settings comprise a combination of the auto-setting values and the second values of the set of parameters or settings associated with the preset.

4. The electronic device of claim 1, wherein the values of the set of parameters or settings comprise differences between the auto-setting values and the second values of the set of parameters or settings associated with the preset.

5. The electronic device of claim 4, wherein the operations comprise combining the differences with the second values of the set of parameters or settings associated with the preset to compute modified values of the set of parameters or settings; and
wherein the image editing is performed based at least in part on the modified values of the set of parameters or settings.

6. The electronic device of claim 1, wherein the image editing is performed on a pixel-basis in the image.

7. The electronic device of claim 1, wherein the values of the set of parameters or settings are associated with a pretrained machine-learning model that predicts the values of the set of parameters or settings for the image.

8. The electronic device of claim 7, wherein the pretrained machine-learning model comprises a neural network.

9. The electronic device of claim 1, wherein the image editing modifies one or more attributes of the image.

10. A non-transitory computer-readable storage medium for use in conjunction with an electronic device, the computer-readable storage medium configured to store program instructions that, when executed by the electronic device, causes the electronic device to perform operations comprising:
providing, addressed to a computer system, an image;
receiving, associated with the computer system, values of a set of parameters or settings, wherein the values of the set of parameters or settings correspond to auto-setting values of the set of parameters or settings and second values of the set of parameters or settings associated with a preset, wherein the values of the set of parameters or settings are based at least in part on or correspond to the image, and wherein the preset is associated with a third party that is different from a user of image-editing software or a provider of the image-editing software; and
performing, using the image-editing software, image editing on the image based at least in part on the values of the set of parameters or settings.

11. The non-transitory computer-readable storage medium of claim 10, wherein the electronic device comprises an image sensor, and the operations comprise acquiring the image using the image sensor.

12. The non-transitory computer-readable storage medium of claim 10, wherein the values of the set of parameters or settings are associated with a pretrained machine-learning model that predicts the values of the set of parameters or settings for the image.

13. The non-transitory computer-readable storage medium of claim 10, wherein the values of the set of parameters or settings comprise a combination of the auto-setting values and the second values of the set of parameters or settings associated with the preset.

14. The non-transitory computer-readable storage medium of claim 10, wherein the values of the set of parameters or settings comprise differences between the auto-setting values and the second values of the set of parameters or settings associated with the preset;
    wherein the operations comprise combining the differences with the second values of the set of parameters or settings associated with the preset to compute modified values of the set of parameters or settings; and
    wherein the image editing is performed based at least in part on the modified values of the set of parameters or settings.

15. A method for performing image editing, comprising:
by an electronic device:
providing, addressed to a computer system, an image;
receiving, associated with the computer system, values of a set of parameters or settings, wherein the values of the set of parameters or settings correspond to auto-setting values of the set of parameters or settings and second values of the set of parameters or settings associated with a preset, wherein the values of the set of parameters or settings are based at least in part on or correspond to the image, and wherein the preset is associated with a third party that is different from a user of image-editing software or a provider of the image-editing software; and
performing, using the image-editing software, the image editing on the image based at least in part on the values of the set of parameters or settings.

16. The method of claim 15, wherein the electronic device comprises an image sensor, and the method comprises acquiring the image using the image sensor.

17. The method of claim 15, wherein the values of the set of parameters or settings are associated with a pretrained machine-learning model that predicts the values of the set of parameters or settings for the image.

18. The method of claim 15, wherein the values of the set of parameters or settings comprise a combination of the auto-setting values and the second values of the set of parameters or settings associated with the preset.

19. The method of claim 15, wherein the values of the set of parameters or settings comprise differences between the auto-setting values and the second values of the set of parameters or settings associated with the preset;
    wherein the method comprises combining the differences with the second values of the set of parameters or settings associated with the preset to compute modified values of the set of parameters or settings; and
    wherein the image editing is performed based at least in part on the modified values of the set of parameters or settings.

20. The method of claim 15, wherein the image editing modifies one or more attributes of the image.

\* \* \* \* \*